United States Patent [19]
Covington, Jr. et al.

[11] Patent Number: 5,912,041
[45] Date of Patent: *Jun. 15, 1999

[54] CANOLA SHORTENING FOR FOOD APPLICATIONS

[75] Inventors: Robert Melvin Covington, Jr., Boise; Ernie H. Unger, Idaho Falls, both of Id.

[73] Assignee: Cargill, Incorporated, Wayzata, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/078,383

[22] Filed: Jun. 17, 1993

[51] Int. Cl.$^6$ ............................................. A23D 7/00
[52] U.S. Cl. ........................ 426/606; 426/601; 426/438
[58] Field of Search .................... 426/601, 606, 426/438

[56] References Cited

U.S. PATENT DOCUMENTS

| | | | |
|---|---|---|---|
| 5,215,779 | 6/1993 | Dake | 426/602 |
| 5,268,191 | 12/1993 | Crosby | 426/606 |

FOREIGN PATENT DOCUMENTS

| | | | |
|---|---|---|---|
| 835334 | 2/1970 | Canada . | |
| WO 91/15578 | 4/1990 | WIPO | C12N 15/00 |
| WO 93/06714 | 4/1993 | WIPO . | |
| WO 93/17566 | 9/1993 | WIPO . | |

OTHER PUBLICATIONS

Caceres 1985 Supported Gold Catalysis in the Hydrogenation of Canola Oil JAOCS 62(5) 906.
NTIS Tech Notes, "Food Flavor Enhanced by Lowering Vegetable Oil Acid", 1992.
Warner et al., "Frying Stability of Soybean and Canola Oils with Modified Fatty Acid Compositions", *JAOCS*, vol. 70, No. 10, 983–988, 1993.
Carr, "Development of Deep–Frying Fats", *Food Technology*, vol. 45, No. 2, 95–96, 1991.
Stevenson et al., "Performance of Canola and Soybean Fats in Extended Frying", *Can. Inst. Food Sci. Technol. J.*, vol. 17, No. 4, 187–194, 1984.
Database WPI, Week 9249, Derwent Publications Ltd., 92–399446, Jun. 17, 1992.
Database WPI, Week 7735, Derwent Publications Ltd., 77–61867Y, Jul. 15, 1977.
Sinram et al., "Flavored Vegetable Oils as a Substitute for Beef Tallow in Deep–Frying Applications", *Food Technology*, vol. 43, No. 6, 90–94, 1989.
"Storage and Performance Stability of Vegetable Oils", *Food Marketing & Technology*, vol. 6, No. 2, 20–24, 1992.
Hawrysh, "Use of Canola Oil for Snacks and Convenience Foods", *INFORM*, vol. 3, No. 4, 543, 1992.
Eskin et al., Stability of Low Linolenic Acid Canola Oil To Frying Temperatures, *JAOCS*, 66 No. 8, 1081–1084, Aug. 1989.
Bansal et al., Effect of Hydrogenation on the Chemical Composition of Canola Oil, *J. of Food Science*, 47, 1338–1344, 1982.
Koseoglu et al., Hydrogenation of Canola Oil, *Canola and Rapeseed*, Shahidi (*ED.*), Chap 8, 123–148, Van Nostrand Reinhold, NY, NY 1990.
Pricat Catalysts, Versatile Catalysts for Hydrogenation of Triglycerides and Fatty Acids, *Hydrogenation of Canola Oil*, Tech Info Bulletin, Mar. 1992.
Mounts and Warner, Handbook of Soy Oil Processing and Utilization, Erickson et al. (Eds), *Evaluation of Finished Oil Quality*, Chap 15, American Soybean Assn., St. Louis, MO, 1980.
Mounts et al., Effect of Altered Fatty Acid Composition on Soybean Oil Stabiltiy, *JAOCS.*, 65 No. 4, 624–628, Apr. 1988.
Warner et al., Flavor & Oxidative Stability of Soybean, Sunflower & Low Erucic Acid Rapeseed Oils, *JAOCS.*, 66 No. 4, 558–564, Apr. 1989.

*Primary Examiner*—Carolyn Paden
*Attorney, Agent, or Firm*—Fish & Richardson, P.C., P.A.

[57] ABSTRACT

A shortening comprising a partially hydrogenated plastic canola having a maximum saturated fatty acid content of about 11.7% and suitable for frying foods.

12 Claims, No Drawings

CANOLA SHORTENING FOR FOOD APPLICATIONS

The present application relates to a partially hydrogenated solid canola shortening low in saturated fatty acids, having improved flavor and performance attributes especially suitable for food applications.

BACKGROUND

As consumers become more aware of the health impact of lipid nutrition, consumption of canola oil in the U.S. has increased. However, generic canola oil has limited use in deep frying operations, an important segment of the food processing industry, due to its instability. Oil extracted from the seed of commercial canola (rapeseed) varieties contains a relatively high (8%–13%) linolenic acid content ($C_{18:3}$) (ALA). Linolenic acid has been reported to oxidize faster than other fatty acids. Linoleic and linolenic acids have been suggested as precursors to undesirable odor and flavor development in foods. Generic canola oil is unstable and easily oxidized during cooking, which in turn compromises the sensory characteristics of foods cooked in such oils. It also develops unacceptable off odors and rancid flavors during storage.

Hydrogenation can be used to improve performance attributes by lowering the amount of linoleic and linolenic acids in the oil. In this process the oil increases in saturated and trans fatty acids. Bansal et al., Journal of Food Science, Vol, 47, p. 1338 (1982) described the effect of hydrogenation under selective and nonselective conditions using commercial nickel catalysts on the chemical composition of canola oil.

Research has shown that diets high in saturated fats increase low density lipoproteins, which promote the deposition of cholesterol on blood vessels. Low fat diets have long been known to be an effective means for lowering the serum-cholesterol level in humans. Solid fat products, such as shortening and margarine, contain high levels of saturated fatty acids, typically $C_{12:0}$, $C_{14:0}$, $C_{16:0}$ and $C_{18:0}$. These saturated fatty acids are necessary to maintain the desired physical and functional characteristics of the solid fat product.

A canola shortening having improved stability in its flavor and performance attributes for use in food operations is needed. In particular, a partially hydrogenated canola shortening having improved frying performance but with low saturated fatty acid content is desired. The present invention provides such a shortening.

SUMMARY OF THE INVENTION

The present invention provides a shortening comprising a partially hydrogenated plastic canola having a maximum saturated fatty acid content of about 11.7%. The shortening of the present invention also has fry stability as demonstrated by lower off-flavor development compared to the industry standard frying shortening. The present invention further comprises a method of improving the flavor of fried foods comprising frying the foods in the shortening of the present invention.

DETAILED DESCRIPTION OF THE INVENTION

The present invention provides a hydrogenated canola shortening low in saturated fatty acids having superior stable flavor and frying attributes when compared to known frying oils.

In the context of this disclosure, a number of terms are used. Saturated fatty acids include the myristic ($C_{14:0}$), palmitic ($C_{16:0}$), stearic ($C_{8:0}$), arachidic ($C_{20:0}$), behenic ($C_{22:0}$), and lignoceric ($C_{24:0}$) acids.

The $C_{x:y}$ designation refers to fatty acids groups wherein x is the number of carbon atoms and y is the number of double bonds.

The term "plastic" or "solid" shortening refers to a solid, non-fluid, and non-pourable shortening at typical storage temperatures of about 20° to 25° C.

As used herein, "functionality" or "performance attributes" means properties or characteristics of the canola oil and includes flavor stability, fry stability, and oxidative stability.

Oxidative stability relates to how easily components of an oil oxidize which creates off-flavors in the oil, and is measured by instrumental analysis such as Accelerated Oxygen Method (AOM) American Oil Chemists' Society Official Method Cd 12–57 for Fat Stability: Active Oxygen Method (re'vd 1989), and Rancimat (Laubli, M. W. and Bruttel, P. A., JOACS 63:792–795 (1986)). The degree of oxidative stability is rated as the number of hours to reach a peroxide value of 100.

Solid fat index is an empirical measure of the solid fat content of a sample. To determine the handling properties of fat the solid fat index is used to predict the consistency over a wide temperature range. It is calculated from the specific volumes associated with combined liquid and solid phases at 10, 21.1, 26.7, 33.3 and 40° C. utilizing a dilatometric scale as described in American Oil Chemists' Society Official Method Cd 10–57 for Solid Fat Index (re'vd 1989). The Mettler drop point is the temperature at which a solid fat becomes fluid to flow. Determination of the drop point is described in American Oil Chemists' Society Official Method Cc 18–80 (re'vd 1989).

Fry stability relates to the resistance to degeneration of the oil during frying. "Fry life" is the time it takes for the flavor of a product fried in an oil to degrade to give a set score using sensory analysis. Improved stability characteristics of the oil are reflected in improved flavors of the foods prepared from the oil. Flavor stability is determined by periodic sensory analysis of foods fried in the oil by a trained sensory panel. Oils for restaurants, hospitals, and large institutions primarily are used for frying foods and require fry stability.

A sensory panel refers to those individuals involved in the sensory evaluation of the edible food product. The panelists are prescreened to detect the flavor differences in the particular product tested. The panel is trained in sensory descriptions. The panel provides qualitative and quantitative scores for the sensory evaluation which are referenced against calibrated standards. The results of the panel are reproducible.

"Canola" refers to rapeseed (Brassica) which has an erucic acid ($C_{22:1}$) content of at most 2 percent by weight based on the total fatty acid content of a seed, preferably at most 0.5 percent by weight and most preferably essentially 0 percent by weight and which produces, after crushing, an air-dried meal containing less than 30 micromoles ($\mu$mol) of glucosinolates per gram of defatted (oil-free) meal.

The shortening of the present invention is designated IMC 87. IMC 87 is a refined, bleached, partially hydrogenated and deodorized solid canola shortening. This shortening is solid at room temperature. IMC 87 is made by partially hydrogenating a starting oil designated as IMC 01. IMC 01 oil is produced from Brassica napus plant line, a Spring canola variety, designated IMC 01. It is described in detail in U.S. PVP Certificate No. 9100138. The IMC 01 variety possesses low linolenic acid of about 1.5% to about 7% in the seed oil depending on the growing conditions. Under normal growing conditions the linolenic acid content is from about 2.5% to about 4.5%. This oil has an oleic acid content of 60 to 75% by weight, a linoleic acid content of 15 to 30% by weight, a linolenic acid content of less than 7% by weight, and an erucic acid content of less than 2% by weight. The oil has an iodine value of less than 115.

Hydrogenation is done at a temperature of 150° to 190° C. Standard batch hydrogenation equipment featuring internal steam heating and water cooling is used. A selective nickel supported catalyst such as Nysosel SP7 (Engelhard, Cleveland, Ohio), or Pricat 9908 (Unichem, Emmerich, Germany) may be used. The IMC 01 starting oil is hydrogenated to a refractive index of approximately 1.4587 at 48° C. and an iodine value between about 78 and 88.

The resulting canola shortening of the present invention has a maximum saturated fatty acid content of about 11.7% and a maximum total trans fatty acid content of about 71.4%. It also has a minimum oxidative stability of about 191 AOM hours in the absence of antioxidants. The Mettler drop point of this shortening is about 33.5° C. The solid fat index profile for IMC 87 is as follows: 10° C., 46.6%; 21.1° C., 25.2%; 26.7° C., 10.4%; 33.3° C., 0.9%; and 40° C., 0%. IMC 87 has a maximum polyunsaturated fatty acid content ($C_{18:2}+C_{18:3}$, linoleic+linolenic) of about 3.4%, and a minimum iodine value of about 78.4.

Under extended frying conditions, the IMC 87 shortening is substantially equivalent to commercial frying oils in the development of off-flavors. The sensory panelists found food fried in IMC 87 had consistently less burnt notes.

The shortening of the present invention is especially suitable for use in food applications, in particular for frying foods, due to its superior oxidative stability and low levels of saturated fatty acids. Common additives can be added to the shortening of the present invention such as a stabilizer, flavoring, emulsifier, anti-spattering agent, colorant, or anti-oxidant.

The present invention is further defined in the following Examples, in which all parts and percentages are by weight and degrees are Celsius, unless otherwise stated. It should be understood that these Examples, while indicating preferred embodiments of the invention, are given by way of illustration only.

EXAMPLE 1

The fatty acid composition of the IMC 01 starting oil which was hydrogenated is provided in Table 1. The iodine value of the starting oil was 106.9. The refractive index of the starting oil was 1.4602 at 48° C.

TABLE 1

Fatty Acid Composition of the Starting Oil, IMC 01
Fatty Acid Composition (%)

| $C_{16:0}$ | $C_{18:0}$ | $C_{18:1}$ | $C_{18:2}$ | $C_{18:3}$ | $C_{20:0}$ | $C_{22:0}$ | $C_{22:1}$ | $C_{24:0}$ | Sats[1] |
|---|---|---|---|---|---|---|---|---|---|
| 3.9 | 2.2 | 62.6 | 24.0 | 3.8 | 0.7 | 0.4 | 0.4 | 0.2 | 7.4 |

[1]Total content of saturated fatty acids

The hydrogenation was conducted in a pilot plant scale run in a standard batch hydrogenation reactor at a pressure varying between 240 and 280 kPa. The oil was heated to an initial gassing temperature of 175° C. and the hydrogenation was conducted over a period of approximately 75 min. The nickel catalyst used was Nysosel SP7. The oil was hydrogenated to a refractive index of 1.4587 at 48° C.

After the hydrogenation 80 to 100 ppm citric acid dissolved in propylene glycol was added to the oil prior to filtration to help in the removal of nickel and iron from the oil. The hydrogenated oil was deodorized under standard deodorization conditions for canola. Fatty acid composition of the hydrogenated and deodorized IMC 87 oil is in Table 4. The Mettler drop point of the shortening was 32.7° C. The IMC 87 oil was clear and brilliant at 60° C. Other physical properties of the IMC 87 oil are described in Table 5.

EXAMPLE 2

The fatty acid composition of the IMC 01 starting oil which was hydrogenated is provided in the Table 2. The iodine value of the starting oil was 105.9.

TABLE 2

Fatty Acid Composition (%) of the Starting Oil, IMC 01

| 16:0 | 18:0 | 18:1 | 18:2 | 18:3 | 20:0 | 20:1 | 22:0 | 22:1 | 24:0 |
|---|---|---|---|---|---|---|---|---|---|
| 3.6 | 2.4 | 60.4 | 25.2 | 3.0 | 0.8 | 1.9 | 0.4 | 1.5 | 0.2 |

Total Saturates = 7.4%

The hydrogenation was conducted on a pilot plant scale using the same conditions as Example 1 except that oil was hydrogenated to a refractive index of 1.4573 at 48° C. The hydrogenated oil was deodorized as in Example 1. The fatty acid composition of the hydrogenated and deodorized oil is in Table 4 and other physical properties are in Table 5.

EXAMPLE 3

The fatty acid composition of the IMC 01 which was hydrogenated is provided in the following table:

TABLE 3

Fatty Acid Composition (%) of the Starting Oil, IMC 01

| $C_{16:0}$ | $C_{18:0}$ | $C_{18:1}$ | $C_{18:2}$ | $C_{18:3}$ | $C_{20:0}$ | $C_{20:1}$ | $C_{22:0}$ | $C_{22:1}$ | $C_{24:0}$ |
|---|---|---|---|---|---|---|---|---|---|
| 4.1 | 2.4 | 64.1 | 22.6 | 3.6 | 0.7 | 1.1 | 0.3 | 0.3 | 0.3 |

Total saturates = 7.5%

The iodine value of the starting oil was 106.5. The refractive index of the starting oil was 1.4364 at 45° C.

The hydrogenation was conducted in a plant scale run standard batch hydrogenation reactor at a pressure between 98 and 230 KPa. The oil was heated to an initial gassing temperature between 163° and 168° C. and hydrogenation was conducted over a period of between 145 and 75 min. The nickel catalyst used was Nysosel SP-7. The oil was hydrogenated to a refractive index between 1.4599 and 1.4601 at 45° C.

After hydrogenation 80 to 100 ppm citric acid dissolved in propylene glycol was added to the oil prior to filtration to help in the removal of nickel and iron from the oil. The above process conditions represent two commercial hydrogenation batches. The two batches were composited prior to deodorization. The hydrogenated oil was deodorized under standard deodorization conditions for canola oil. Fatty acid composition of the hydrogenated and deodorized oil is in Table 4. The IMC 87 oil was clear and brilliant at 60° C. The Mettler drop point was 33.5° C. Other physical properties are described in Table 5.

TABLE 4

Fatty Acid Composition (%) of
Hydrogenated and Deodorized IMC 87 Shortening

| Fatty Acid | Example 1 | Example 2 | Example 3 |
|---|---|---|---|
| $C_{16:0}$ | 4.2 | 3.7 | 5.0 |
| $C_{18:0}$ | 5.7 | 4.5 | 5.5 |
| $C_{18:1}$ | 85.2 | 83.0 | 82.8 |
| $C_{18:2}$ | 1.7 | 3.4 | 3.1 |
| $C_{18:3}$ | 0.0 | 0.0 | 0.2 |
| $C_{20:0}$ | 0.7 | 0.8 | 0.7 |
| $C_{20:1}$ | — | 1.9 | 1.2 |
| $C_{22:0}$ | 0.4 | 0.4 | 0.3 |
| $C_{22:1}$ | — | 1.5 | 0.2 |
| $C_{24:0}$ | 0.2 | 0.2 | 0.2 |
| Sats[1] | 11.2 | 9.6 | 11.7 |
| Trans[2] | 68.9 | 71.4 | 65.0 |

[1]Total content of saturated fatty acids
[2]Total content of trans fatty acids

TABLE 5

Physical Measurements of IMC 87

| Parameter | Example 1 | Example 2 | Example 3 |
|---|---|---|---|
| Refractive Index | 1.4587 at 48° C. | 1.4573 at 48° C. | 1.4600 at 45° C. |
| Free Fatty Acids (%) | 0.01 | 0.01 | 0.04 |
| Lovibond Color, 5 1/4" | 0.5 Red | 0.2 Red | 0.1 Red |
| Iodine Value | 82.4 | 83.6 | 78.4 |
| Trans Isomers (%) | 68.9 | 71.4 | 65 |
| AOM hours | 260 | 230 | 191 |
| Solid Fat Index | | | |
| 10.0° C. | 49.0 | 39.6 | 46.6 |
| 21.1° C. | 25.7 | 16.3 | 25.2 |
| 26.7° C. | 12.0 | 3.8 | 10.4 |
| 33.3° C. | 0.8 | 0.0 | 0.9 |
| 40.0° C. | 0.0 | 0.0 | 0.0 |
| Mettler Drop Point, 0° C. | 32.7 | 31.4 | 33.5 |

French fry preparation in restaurants occurs in two steps. Potatoes are cut and partially cooked, a process called par frying, and frozen by a food processor for delivery to individual restaurants. The frozen par fried french fries are then recooked, a process called finished frying, at the restaurant immediately prior to service. IMC 87 shortening of Example 2 was tested against 189LC, a leading industry standard frying oil, a partially hydrogenated soybean oil available from Interstate Corp., 38005 Morgan St., Chicago, Ill. 60609 for frying of french fries. The quality of the french fries fried in each oil were then evaluated to determine the fry stability of each oil for restaurant frying.

The par fried french fries used with the 189LC finish oil were produced in a partially hydrogenated soybean oil with an added flavoring. The IMC 87 oil was tested using two par fry treatments. In one treatment (IMC 87 with flavor) the par fries were produced in a partially hydrogenated canola oil with added flavoring. In the second treatment (IMC 87 without flavor) the par fries produced in a partially hydrogenated canola oil (IMC 87 without added flavor). The par fry flavoring used in the IMC 87 and 189LC test was similar.

The IMC 87 and 189LC oils were tested in 22-day fry test which simulated commercial food service conditions. Equal volumes of the test oils were placed into each vat of the pilot plant fryer (FryMaster MACH352SD, Frymaster Corp., Welbilt Co., Shreveport, La.). In each vat 88.5 kg of shoestring french fries were fried per day. The par fried french fries were finish fried in the oils using a fry time of 3 min. The oil temperature was maintained at 171° C. Fresh oil was added twice per day to the fry vats to make up for oil absorption by the french fries. Each vat of frying oil was filtered nightly using 0.68 kg of fresh Magnesol XL filter media (Dallas Group, Jeffersonville, Ind.) with a Prince Castle filter (Prince Castle, Carole Stream, Ill.).

The french fries were checked daily for color, internal texture, external texture, and flavor. French fry color measurements were made by an Agtron instrument from Agtron Inc., Sparks, Nev. Internal texture, external texture, aroma and flavor were determined by a trained sensory panel. Over the duration of the fry test the internal and external texture of the french fries fried in the IMC 87 oils remained similar (Table 6). After day 12 the french fries finished in 189LC had poorer internal and external texture than the french fries finished in the IMC 87 oil. The overall internal and external texture scores of the french fries in the 189LC oil were significantly lower than the french fries finished in 87 (significant at greater than 95% confidence interval). The french fry the 189LC and IMC 87 fries remained comparable throughout the test (Table 7).

The trained sensory panel evaluated the three treatments and found them to be similar over the frying time. The two IMC 87 treatments had consistently less burnt notes over the test.

The weight (kg) of make-up oil used to replenish the two IMC 87 canola vats during frying was identical. The 189LC vat required 8% more oil than each IMC 87 oil vats (Table 7). The fatty acid composition of 189LC and IMC 87 is listed in Table 8.

TABLE 6

French Fry Texture During Fry Testing

| | Internal Texture | | | External Texture | | |
|---|---|---|---|---|---|---|
| Attributes Day | 189LC | IMC 87 with flavor | IMC 87 w/o flavor | 189LC | IMC 87 with flavor | IMC 87 w/o flavor |
| 1 | 86 | 82 | 78 | 96 | 94 | 92 |
| 2 | 78 | 76 | 74 | 94 | 92 | 92 |
| 3 | 72 | 74 | 70 | 88 | 94 | 90 |
| 4 | 66 | 56 | 60 | 88 | 84 | 88 |
| 5 | 64 | 70 | 56 | 86 | 88 | 82 |
| 6 | 64 | 52 | 62 | 90 | 80 | 84 |
| 7 | 78 | 74 | 64 | 92 | 86 | 74 |
| 8 | 70 | 68 | 68 | 88 | 86 | 88 |
| 9 | 74 | 64 | 66 | 90 | 86 | 88 |
| 10 | 70 | 60 | 60 | 88 | 86 | 84 |
| 11 | 56 | 62 | 54 | 86 | 84 | 86 |
| 12 | 26 | 50 | 52 | 72 | 82 | 86 |
| 13 | 74 | 70 | 66 | 88 | 82 | 86 |
| 14 | 58 | 70 | 72 | 78 | 82 | 86 |
| 15 | 34 | 56 | 60 | 72 | 86 | 88 |
| 16 | 46 | 62 | 44 | 78 | 90 | 84 |
| 17 | 32 | 60 | 68 | 68 | 88 | 90 |
| 18 | 32 | 54 | 66 | 70 | 82 | 84 |
| 19 | 34 | 60 | 68 | 60 | 80 | 86 |
| 20 | 22 | 54 | 54 | 60 | 80 | 86 |
| 21 | 24 | 52 | 56 | 58 | 80 | 82 |
| 22 | 24 | 46 | 52 | 54 | 74 | 84 |
| Mean | 54 | 61 | 62 | 79 | 85 | 86 |

TABLE 7

French Fry Color and Oil Absorption of Frying Oils

| Attributes Day | Fried Color | | | Make-up Oil (kg) | | |
|---|---|---|---|---|---|---|
| | 189LC | IMC 87 with flavor | IMC 87 w/o flavor | 189LC | IMC 87 with flavor | IMV 87 w/o flavor |
| 1 | 63.8 | 62.9 | 62.4 | 7.0 | 6.8 | 5.4 |
| 2 | 62.1 | 63.3 | 62.4 | 5.4 | 5.7 | 5.7 |
| 3 | 60.2 | 65.4 | 62.5 | 5.7 | 5.2 | 5.2 |
| 4 | 63.2 | 63.2 | 59.9 | 5.7 | 5.7 | 5.7 |
| 5 | 60.7 | 63.5 | 63.9 | 5.7 | 5.2 | 5.7 |
| 6 | 61 | 64 | 66 | 5.9 | 5.2 | 5.2 |
| 7 | 62 | 65 | 63 | 5.0 | 5.0 | 5.2 |
| 8 | 60.6 | 64.1 | 61.1 | 5.9 | 5.7 | 5.4 |
| 9 | 59.8 | 65.2 | 60.9 | 5.7 | 5.9 | 5.7 |
| 10 | 58.3 | 64.9 | 64.1 | 5.4 | 6.1 | 5.9 |
| 11 | 58.3 | 67.3 | 65.7 | 5.7 | 5.0 | 5.0 |
| 12 | 64.1 | 64.5 | 64.2 | 5.2 | 4.8 | 4.4 |
| 13 | 61 | 65.4 | 64.8 | 5.0 | 5.0 | 4.9 |
| 14 | 61.4 | 65.8 | 64.2 | 5.1 | 5.2 | 4.8 |
| 15 | 60.1 | 66.7 | 64.4 | 5.7 | 5.2 | 5.2 |
| 16 | 58.5 | 62.5 | 60.8 | 6.5 | 5.1 | 6.1 |
| 17 | 62.9 | 58.1 | 62.3 | 4.8 | 5.7 | 5.2 |
| 18 | 58.2 | 63.1 | 65.4 | 4.8 | 5.7 | 5.2 |
| 19 | 58.5 | 62.9 | 65.8 | 5.2 | 4.8 | 5.4 |
| 20 | 59.4 | 63.7 | 64 | 5.2 | 4.5 | 5.2 |
| 21 | 63.5 | 59.8 | 62.8 | 5.2 | 4.2 | 5.1 |
| 22 | 61.2 | 62.2 | 61.47 | 4.9 | 4.1 | 4.5 |

TABLE 8

Fatty Acid Composition (%) of Frying Shortening

| Fatty Acid | 189LC | IMC 87 |
|---|---|---|
| $C_{16:0}$ | 11.7 | 5.0 |
| $C_{18:0}$ | 10.1 | 5.5 |
| $C_{18:1}$ | 65.2 | 82.8 |
| $C_{18:2}$ | 9.5 | 3.1 |
| $C_{18:3}$ | 0.2 | 0.2 |
| $C_{20:0}$ | 0.3 | 0.7 |
| $C_{22:0}$ | 0.2 | 0.3 |
| $C_{24:0}$ | 0.1 | 0.2 |
| Sats[1] | 22.6 | 11.7 |
| Trans[2] | 43.4 | 65.0 |

[1]Total content of saturated fatty acids.
[2]Total content of trans fatty acids.

What is claimed is:

1. A shortening comprising a partially hydrogenated plastic canola oil having a maximum saturated fatty acid content of about 11.7%, a maximum polyunsaturated fatty acid content ($C_{18:2}$+$C_{18:3}$) of about 3.4%, a maximum iodine value of about 83.6 and a minimum oxidative stability of about 191 AOM hours in the absence of antioxidants.

2. The shortening of claim 1 having a maximum total content of trans fatty acids of about 71.4%.

3. The shortening of claim 1 having a solid fat index profile of 46.6% at 10.0° C., 25.2% at 21.1° C., 10.4% at 26.7° C., 0.9% at 33.3° C., and 0% at 40.0° C.

4. The shortening of claim 1 to which has been added at least one additive selected from the group consisting of a stabilizer, flavoring, emulsifier, anti-spattering agent, colorant, and antioxidant.

5. A shortening of claim 1 with a Mettler drop point of about 33.5° C.

6. A shortening of claim 3 with a Mettler drop point of about 33.5° C.

7. A method of improving the flavor of fried foods comprising frying said foods in a shortening comprising partially hydrogenated plastic canola oil having a maximum saturated fatty acid content of about 11.7%, a maximum polyunsaturated fatty acid content ($C_{18:2}$+$C_{18:3}$) of about 3.4%, a maximum iodine value of about 83.6 and a minimum oxidative stability of about 191 AOM hours in the absence of anti-oxidants.

8. The method of claim 7, said shortening having a maximum total content of trans fatty acids of about 71.4%.

9. The method of claim 8, said shortening having a Mettler drop point of about 33.5° C.

10. The method of claim 7, said shortening having a solid fat index profile of 46.6% at 10.0° C., 25.2% at 21.1° C., 10.4% at 26.7° C., 0.9% at 33.3° C., and 0% at 40.0° C.

11. The method of claim 7, said shortening further comprising at least one additive selected from the group consisting of a stabilizer, flavoring, emulsifier, anti-spattering agent, colorant, and antioxidant.

12. The method of claim 7, said shortening having a Mettler drop point of about 33.5° C.

* * * * *